United States Patent
Huang

(10) Patent No.: US 6,648,432 B2
(45) Date of Patent: Nov. 18, 2003

(54) FOLDABLE STRUCTURE FOR A MAIN UNIT AND SCREEN OF A GAME MACHINE

(76) Inventor: Hsien-Chung Huang, 63, Lane 65, Hsin Kuang Road, Ping Cheng, Taoyuan Hsien (TW)

(*) Notice: Subject to any disclaimer, the term of this patent is extended or adjusted under 35 U.S.C. 154(b) by 12 days.

(21) Appl. No.: 10/028,503

(22) Filed: Dec. 28, 2001

(65) Prior Publication Data

US 2003/0122973 A1 Jul. 3, 2003

(51) Int. Cl.[7] .............................................. H05K 7/16
(52) U.S. Cl. ..................... 312/327; 312/223.1; 361/681
(58) Field of Search ................................. 312/111, 201, 312/202, 223.1, 223.2, 7.2, 328, 327; 361/681, 682, 683; 248/917, 918, 923, 919, 920, 921, 922

(56) References Cited

U.S. PATENT DOCUMENTS

| D277,962 S | * | 3/1985 | Thom | D14/331 |
| 4,647,043 A | * | 3/1987 | Wiczer | 273/121 R |
| 5,175,672 A | * | 12/1992 | Conner et al. | 361/680 |
| 6,028,764 A | * | 2/2000 | Richardson et al. | 361/681 |
| 6,400,560 B1 | * | 6/2002 | Chian | 361/681 |

FOREIGN PATENT DOCUMENTS

GB 2352534 * 1/2001

* cited by examiner

Primary Examiner—Janet M. Wilkens
(74) Attorney, Agent, or Firm—Troxell Law Office PLLC

(57) ABSTRACT

A foldable structure for a main unit and screen for a game machine whose rotation pivot seat contains a base, top cover and axle joint in-between. A short axle is placed in a transverse through-hole and an axle hole is placed in a cylindrical axle of a pivot joint to allow rotation of the screen around the rotational pivot seat. The movable retainers of the positioning fastener are installed outside two ends of an arch plate. A pressure-sustaining device is installed on the pillar to provide elastic recovery for the arch plate. The contact area between the press button and arch plate forms an inclined push edge to enable a stepwise push on the arch plate and further allow the movable retainer to contract inward to facilitate disassembly and assembly of the main unit of the game machine.

1 Claim, 8 Drawing Sheets

FOLDABLE STRUCTURE FOR A MAIN UNIT AND SCREEN OF A GAME MACHINE

FIELD OF THE INVENTION

The present invention relates to a foldable structure for a main unit and a screen for a game machine, in particular, a separable structure for the main unit and the screen, for the convenience of combination and portability, or change to a larger screen.

BACKGROUND OF THE INVENTION

According to the design of a general portable game machine, the main unit and the screen are integrated as one for convenient operation. Due to the requirements of realistic visual and sound effects for the current game software, usually a game machine is designed with emphasis on functions and improvement on visual and sound performance. As a result, the requirements become more and more stringent.

SUMMARY OF THE INVENTION

The main objective of the present invention is to provide a game machine with a separable screen, which is portable or allows a change of larger screen for use at home, and achieves a function for multiple use.

Further, the size of the combination of the screen and the main unit is small, space saving and conveniently portable.

The embodiments for the present invention are described in details with structural characteristics as follows.

DETAILED DESCRIPTION OF THE INVENTION

Figure 1:
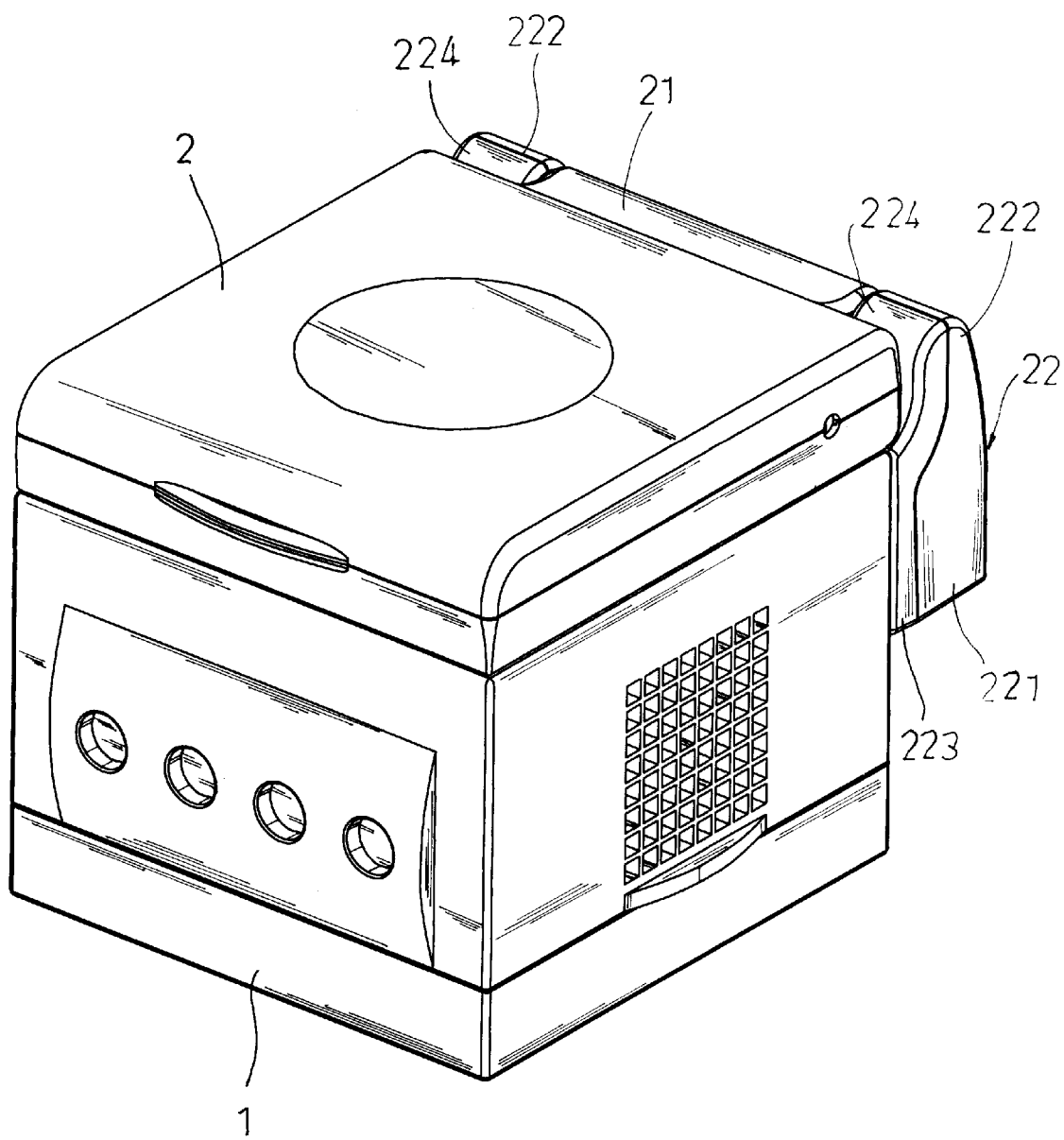
FIG. 1 shows a three-dimensional view of the present invention.
Figure 2:
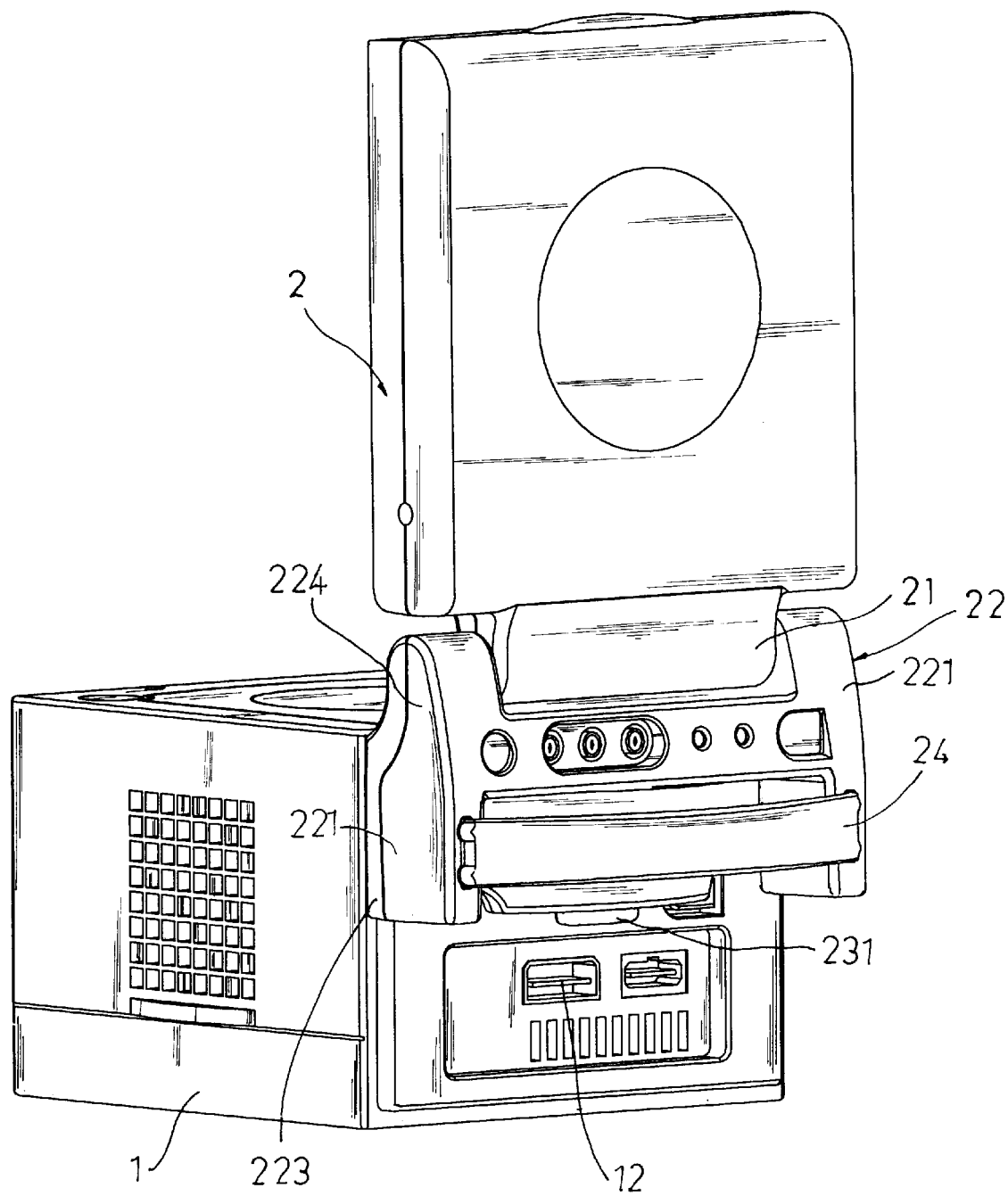
FIG. 2 shows a three-dimensional view of the screen in open state for the present invention.

With reference to the drawings from FIG. 2 to FIG. 8, the present invention includes a separable main unit 1 and a screen 2. At the rear of the main unit 1, there is a handle 11 and sever sockets 12. A positioning groove 13 is located below the handle 11. The screen 2 is associated with a pivot joint 21, a rotational pivot seat 22 and a positioning fastener 23. Wherein, the said pivot joint 21 is installed below the screen 2. The pivot joint 21 has a transverse through hole 211. On a port of the transverse through hole 211, there is a cylindrical axle 212, that has a circular guide groove 2121.

The above-mentioned rotational pivot seat 22 includes a base 221 and a top cover 223, which two can be locked together. On the top of the base 221 and the top cover 223, there are connectable axle joints 222, 224. On one side of the axle joints 222, 224, there are short axles 2221, 2241. On the other side, axle holes 2222, 2242 are available to allow the ends of the short axles 2221, 2241 to be placed in the transverse through hole 211. Rail bars 2223, 2243 inside the axle holes 2222, 2242 can be set into the guide groove 2121 of the cylindrical axle 212 of the pivot joint 21 to enable rotation of the screen 2 against the rotational pivot seat 22. The rear of inside of the top cover 223 is available for the positioning fasteners 23.

Figure 3:
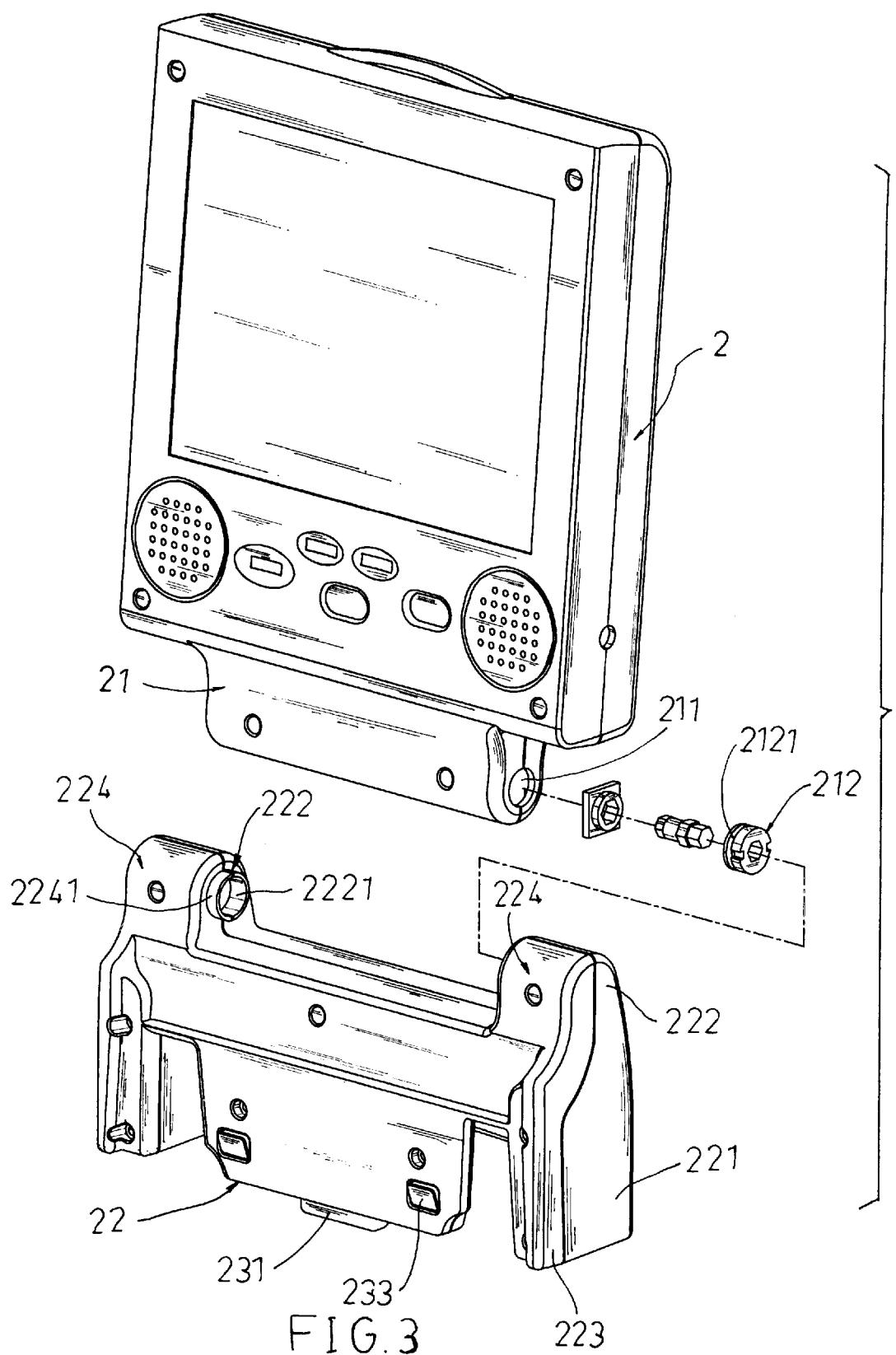
FIG. 3 shows a three-dimensional view of the disassembly of the screen and the rotational pivot seat for the present invention.
Figure 4:
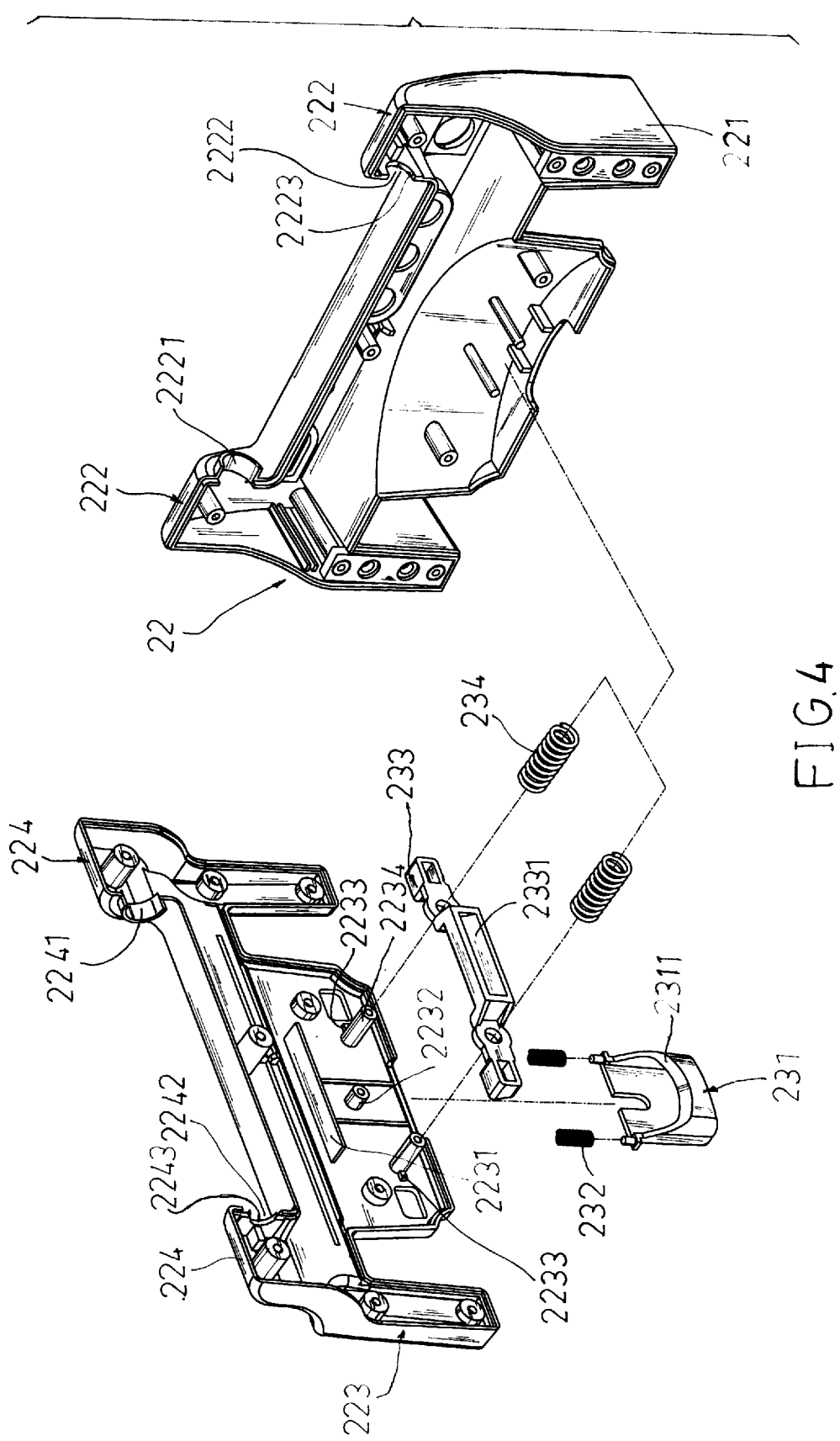
FIG. 4 is a decomposition view of the internal structure of the screen and the rotational pivot seat for the present invention.

With reference to the drawings from FIG. 3 and FIG. 4, the above-mentioned fastener 23 includes a press button 231, movable retainers 233 and two sets of elastic pressure-sustaining devices 234. Wherein, the movable retainers 233 are installed on the two outer sides of an arch plate 2331 and protrude beyond the surface of the top cover 223. The two sides of the arch plate 2331 are located at pillars 2234 of the top cover 223 respectively. The elastic pressure-sustaining devices 234 are located on the pillars 2234 to enable elastic recovery of the arch plate 2331. The central bottom of the arch plate 2331 is available for the press button 231. The contact of the said press button 231 with the arch plate 2331 forms an inclined push edge 2311. Besides springs 232 connected to the rear of inside of the press button 231 can stand the top plate 2331 of the top cover 223 to allow a stepwise push of the inclined push edge 2311 on the arch plate 2331 when the press button 231 is pressed. Further, the said push enables the movable retainers 233 to contract inward for the convenience of the disassembly and assembly of the main unit 1. The two ends of inside of the press button 231 are limited for motion by a positioning block 2233 of the top cover 223. Therefore, when the springs 232 resume to the original position by elasticity after the press button 231 are pressed, the positioning block 2233 allows a restrictive positioning of the press button 231. When the press button 231 are moving, they are lead by protruding guide pillars 2232 beyond the top cover 223 at the center of the press button 231 to avoid unnecessary movement of the press button 231.

Figure 5:
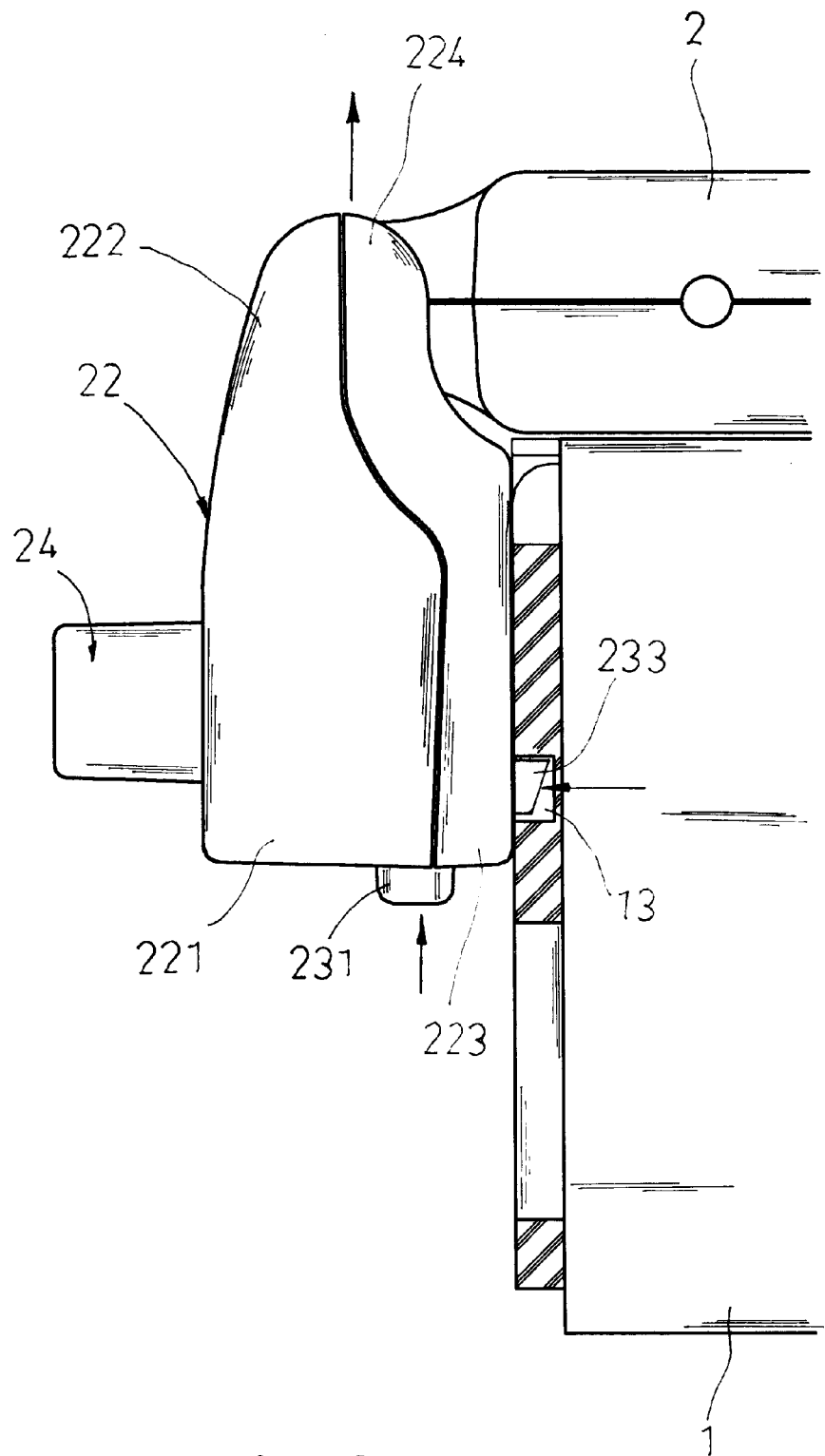
FIG. 5 is a crossectional view of the partial assembly of the screen and the main unit for the present invention.
Figure 6:
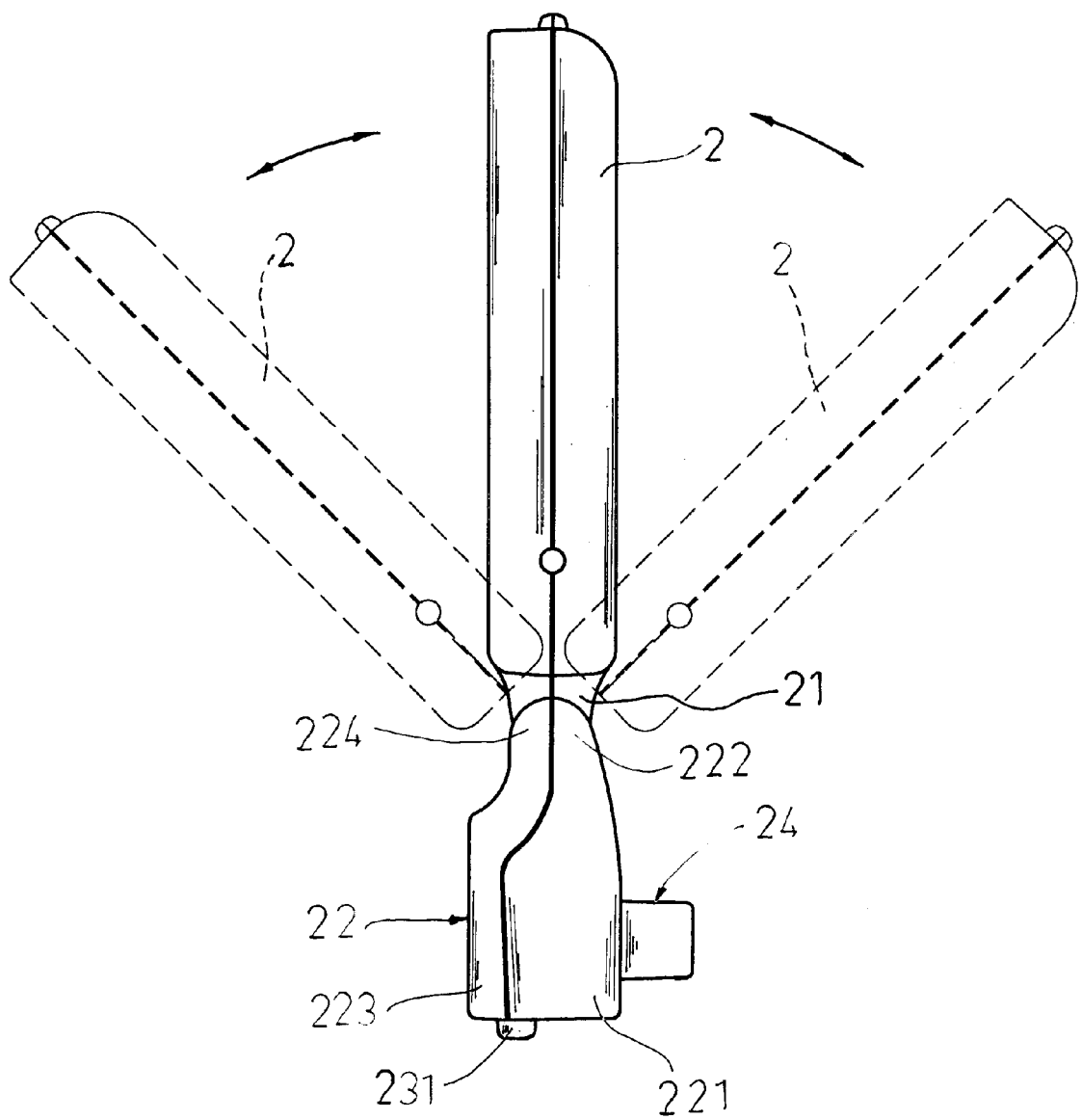
FIG. 6 is a planar view of the angle change of the screen for the present invention.

With reference to the drawings in FIG. 4 and FIG. 5, at the position near the movable retainers 233 of the positioning fastener 23 there is a positioning groove 13, which the movable retainers 233 set inside the positioning groove 13 when the screen 2 and the main unit 1 are combined. Meanwhile, the screen 2 is positioned. Besides, the moveable retainers 233 are pressed toward the positioning groove 13, they contract inward to allow detachment of the positioning fastener 23 from the main unit 1.

With reference to the drawings from FIG. 3 to FIG. 6, when the base 221 and the top cover 223 are locked, the short axles 2221, 2241 on the corresponding axle joints 222, 224 form a cylindrical axle, which can be set into the transverse through hole 211 at one end of the pivot joint 21. While the axle holes 2222, 2242 on the axle joints 222, 224 can be set into the guide groove 2121 of the cylindrical axle 212 on the other end of the pivot joint 21 of the screen 2 to allow connection of the screen 2 with the rotational pivot seat 22 through the pivot joint 21 and angular adjustment.

Figure 7:
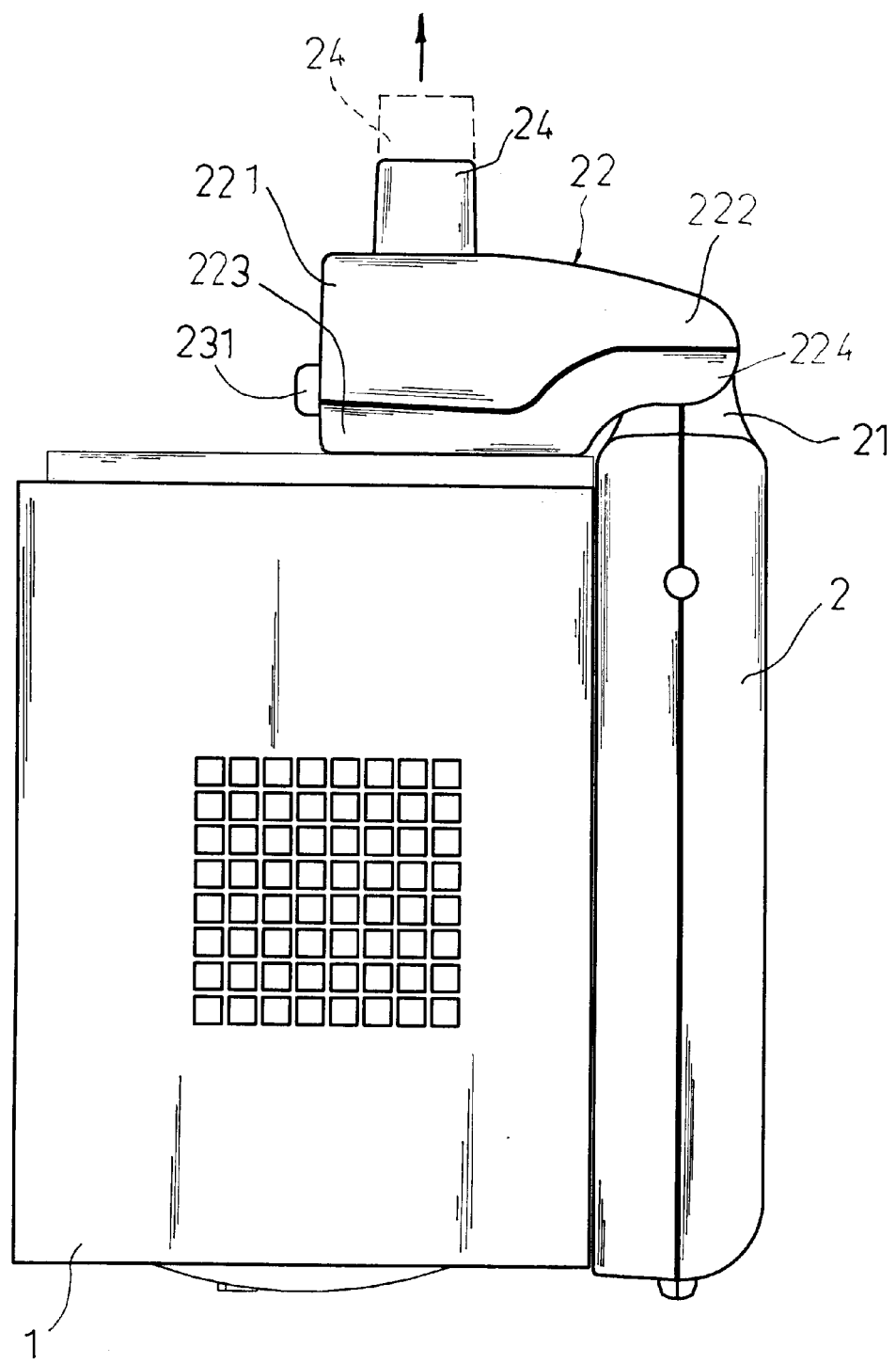
FIG. 7 is an illustration of the use of the handle for the present invention.
Figure 8:
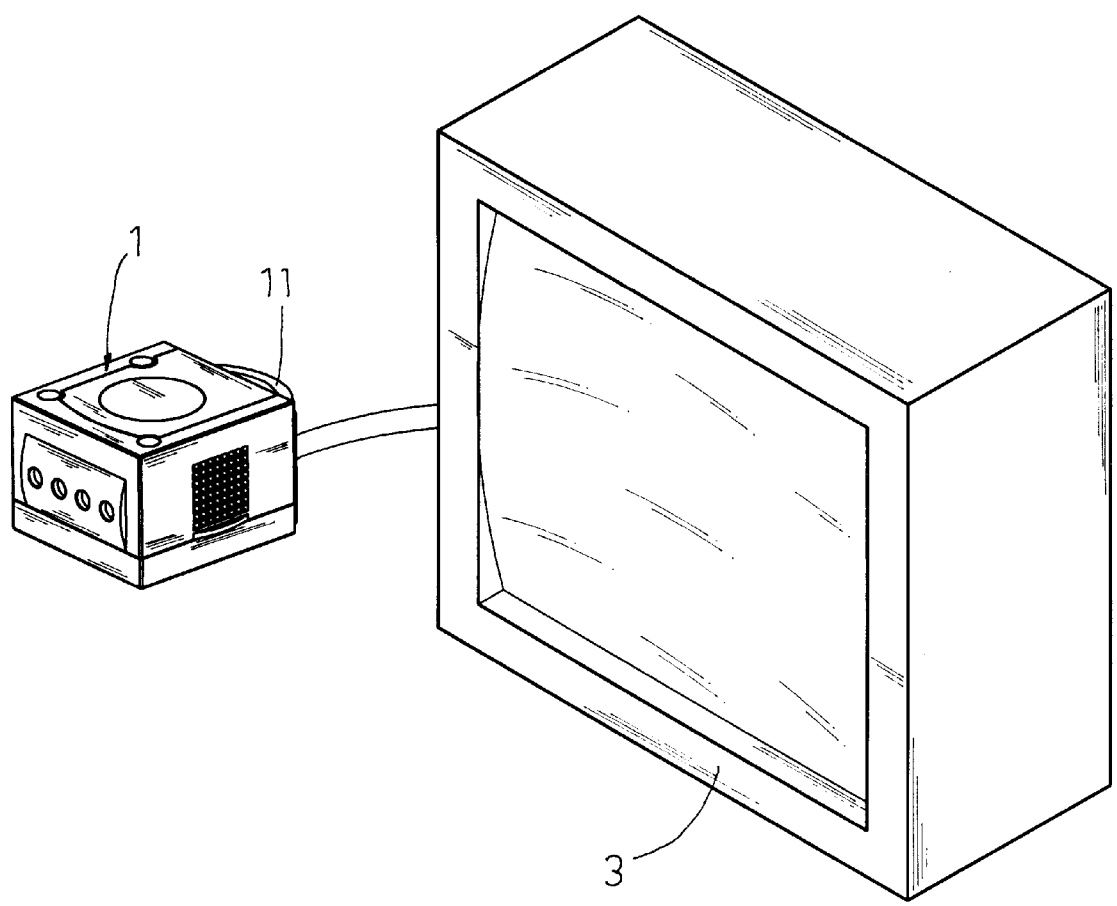
FIG. 8 is a three-dimensional view of an embodiment that allows the connection between the main unit and a television for the present invention.

With reference to FIG. 7, at the rear of the base 221 of the rotational pivot seat 22 for the screen 2, there is a moveable handle 24 to facilitate the portability of the game machine by the moveable handle 24 after the screen 2 and the main unit 1 are combined.

In addition, since the main unit 1 can be conveniently connected with large screen (refer to FIG. 8), like TV 3, after the disassembly of the screen 2 and the main unit 1, better visual and sound effects can be obtained to make the game more realistic and interesting.

What is claimed is:

1. A foldable structure for a main unit and a screen of a game machine comprising:

a) a positioning groove located on a back of the main unit;

b) a pivot joint connected to a base of the screen, the pivot joint having:
        i) a transverse through hole; and
        ii) a cylindrical axle having a circular guide groove, the cylindrical axle being positioned in a first end of the transverse hole in the pivot joint;

c) a rotational pivot seat rotatably connected to the pivot joint, the rotational pivot seat having:
        i) a base;
        ii) a top cover connected to the base; and
        iii) a pair of connected axle joints formed on a top of the co-joined base and top cover, wherein the pair of connected axle joints includes a first axle joint with a first short axle and a first axle hole on the base, a second axle joint with a second short axle and a second axle hole on the top cover, the base being connected to the top cover such that the first short axle and first axle hole aligns with the second short axle and the second axle hole, rail bars of the axle holes being inserted into the circular guide groove of the cylindrical axle, and the pair of connected axle joints being inserted into a second end of the hole in the pivot joint; and d) a positioning fastener having;
        i) two moveable retainers, one moveable retainer connected to each end of an arch plate, the arch plate being positioned on pillars of the top cover and normally biased against the top cover by two elastic pressure sustaining devices such that the two moveable retainers protrude beyond the top cover to releasably engage the positioning groove located on the back of the main unit thereby pivotally connecting the screen to the main unit; and
        ii) a press button normally biased away from the arch plate by springs pressing against the press button and a top plate, the press button having an inclined push edge that releasably engages the arch plate when the press button is pushed towards the top plate such that the two movable retainers are retracted and disengaged from the positioning groove located on the back of the main unit.

\* \* \* \* \*